United States Patent

Jacobs et al.

Patent Number: 5,907,853
Date of Patent: May 25, 1999

[54] METHOD AND APPARATUS FOR MAINTAINING DUPLICATE CACHE TAGS WITH SELECTABLE WIDTH

[75] Inventors: Edward M. Jacobs, Mountain View; Julie W. Moncton, Cupertino, both of Calif.

[73] Assignee: Hewlett-Packard Company, Palo Alto, Calif.

[21] Appl. No.: 08/783,918

[22] Filed: Jan. 17, 1997

[51] Int. Cl.⁶ ..................................................... G06F 12/00
[52] U.S. Cl. ................................ 711/3; 711/146; 711/212
[58] Field of Search ........................... 711/3, 118, 141, 711/144, 146, 212

[56] References Cited

U.S. PATENT DOCUMENTS

| | | | |
|---|---|---|---|
| 4,349,871 | 9/1982 | Lary ......................................... | 711/138 |
| 5,226,146 | 7/1993 | Milia et al. .............................. | 711/141 |
| 5,319,766 | 6/1994 | Thaller et al. ........................... | 711/146 |
| 5,537,570 | 7/1996 | Tran ......................................... | 711/128 |
| 5,559,987 | 9/1996 | Foley et al. .............................. | 711/144 |

OTHER PUBLICATIONS

Singhal et al., "Gigaplane™: A High Performance Bus for Large SMPs," Jul. 19, 1996, pp. 41–52.

*Primary Examiner*—Glenn Gossage

[57] ABSTRACT

A multiprocessor computer architecture containing processor caches that are kept coherent, and in particular, a duplicate cache tag subsystem and method for maintaining duplicate cache tags, are disclosed. The tag width of duplicate cache tags for a processor cache is tailored to available integrated circuit surface area, or to device pin count, without significantly sacrificing system performance. Such partial duplicate tag width may also be reduced at any time during the integrated circuit design phase, should the available integrated circuit surface area or pin-availability decrease. The method disclosed involves requesting data from memory; reading a partial duplicate cache tag list to determine if there is a partial hit; taking the data from the memory if there is no match between a requested address and the partial duplicate cache tag list; holding the data in memory or a requestor module if there is a match between the requested address and the partial duplicate cache tag list; and interrupting processor operation to confirm that the partial duplicate cache tag corresponds to an actual cache tag. The data are taken from the cache if the partial duplicate cache tag matches the actual cache tag and cache status indicates that the data have been modified. The data are taken from memory if the partial duplicate cache tag does not match the actual cache tag or cache status indicates that the data have not been modified.

14 Claims, 3 Drawing Sheets

METHOD AND APPARATUS FOR MAINTAINING DUPLICATE CACHE TAGS WITH SELECTABLE WIDTH

BACKGROUND OF THE INVENTION

1. Technical Field

The invention relates to a multiprocessor computer architecture. More particularly, the invention relates to a multiprocessor computer architecture containing processor caches that are kept coherent.

2. Description of the Prior Art

The flow of information between processors in a computer architecture should avoid the use of stale data, i.e. data that is older than and/or inconsistent with related data stored at another cache location or in main memory. Thus, cache coherency should be maintained, while minimizing interference with processor operation. In computer system architectures, cache coherency can be handled by hardware and/or software. In some such architectures, coherency between the processors and memory is maintained by hardware, while software guarantees coherency between the cache, memory, and input/output devices.

Caches can be classified either as write-through or write-back. A write-through cache is always written to along with system memory, such that system memory and cache each maintain a current copy of the information that is written, and the possibility of stale data is avoided. Information input in computer architecture using a write-through cache requires significant system overhead. For example, the system must guarantee that none of the blocks of the I/O buffer that have been designated for input are in the cache.

Write-back caches keep modified data until the data are cast out and written back to memory to make room for new data. Because a write-back cache may have the only copy of modified data, special care must be taken in the cache coherency protocol between caches and I/O systems such that the cache data can be quickly accessed and never lost.

One software solution to the stale data problem marks a buffer page as non-cacheable, and the operating system is configured to input information only to this non-cacheable page. Another software solution to this problem uses the operating system to flush the buffer addresses from the cache after an information input occurs, effectively clearing the caches. A hardware solution to the stale data problem checks the I/O addresses during information input to determine if they are in the cache. If so, the cache entries are invalidated to avoid stale data.

The protocols that are used to maintain coherency for multiple processors are referred to as cache coherency protocols. There are two classes of cache coherency protocols:

1. Directory based: The information about one block of physical memory is kept in just one location. This information usually includes which cache(s) has (have) a copy of the block and whether that copy is marked exclusive for future modification. An access to a particular block first queries the directory to see if the memory data is stale and the real data resides in some other cache. If it is, then the cache containing the modified block is forced to return its data to memory. Then the memory forwards the data to the new requester, updating the directory with the new location of that block. This protocol minimizes inter-bus module (or inter-cache) disturbance, but typically suffers from high latency and is expensive to build due to the large directory size required.

2. Snooping: Every cache that has a copy of the data from a block of physical memory also has a copy of the information about the data block. Each cache is typically located on a shared memory bus, and all cache controllers monitor or snoop on the bus to determine whether or not they have a copy of the requested block.

Snooping protocols are well suited for multiprocessor system architectures that use caches and shared memory because they operate in the context of the preexisting physical connection usually provided between the bus and the memory. Snooping is preferred over directory protocols because the amount of coherency information is proportional to the number of blocks in a cache, rather than the number of blocks in main memory.

The coherency problem arises in a multiprocessor architecture when a processor must have exclusive access to write a block of memory or object, and/or must have the most recent copy when reading an object. A snooping protocol must locate all caches that share the object to be written. The consequences of a write to shared data are either to invalidate all other copies of the data, or to broadcast the write to all of the shared copies. Because of the use of write back caches, coherency protocols must also cause checks on all caches during memory reads to determine which processor has the most up to date copy of the information.

Status bits are provided in a cache block to implement snooping protocols. This information is used when monitoring bus activities. On a read miss, all caches check to see if they have a copy of the requested block of information and take the appropriate action, such as supplying the information to the cache that missed. Similarly, on a write, all caches check to see if they have a copy of the data, and then act, for example by invalidating their copy of the data, or by changing their copy of the data to the most recent value.

Because every coherent bus transaction causes the caches to check their address tags, snooping interferes with the CPU's access to its cache regardless of the snoop result. For example, even when snooping returns a miss, the CPU is prevented from cache access because the cache is unavailable, i.e. the cache is busy checking tags to match against the snoop address. Thus, the CPU stalls or locks if it needs to access the cache while the cache is busy with a coherency check.

Snooping protocols are of two types:

Write invalidate: The writing processor causes all copies in other caches to be invalidated before changing its local copy. The processor is then free to update the data until such time as another processor asks for the data. The writing processor issues an invalidation signal over the bus, and all caches check to see if they have a copy of the data. If so, they must invalidate the block containing the data, and provide the data if the status indicates that the block has been modified. This scheme allows multiple readers but only a single writer.

Write broadcast: Rather than invalidate every block that is shared, the writing processor broadcasts the new data over the bus. All copies are then updated with the new value. This scheme continuously broadcasts writes to shared data, while the write invalidate scheme discussed above deletes all other copies so that there is only one local copy for subsequent writes. Write broadcast protocols usually allow data to be tagged as shared (broadcast), or the data may be tagged as private (local). For further information on coherency, see J. Hennessy, D. Patterson, *Computer Architecture: A Quantitative Approach,* Morgan Kaufmann Publishers, Inc. (1990).

In a snoopy coherence multiprocessor system architecture, each coherent transaction on the system bus is forwarded to each processor's cache subsystem to perform a coherency check. This check usually disturbs the processor's pipeline because the cache cannot be accessed by the processor while the coherency check is taking place.

In a traditional, single ported cache without duplicate cache tags, the processor pipeline is stalled on cache access instructions when the cache controller is busy processing cache coherency checks for other processors. For each snoop, the cache controller must first check the cache tags for the snoop address and, if there is a hit, then modify the cache state, and provide data if the status indicates that the block has been modified. Allocating cache bandwidth for an atomic (unseparable) tag read and write (for possible modification) locks the cache from the processor longer than needed if the snoop does not require a tag write. For example, 80% to 90% of the cache queries are misses, i.e. a tag write is not required.

It is possible to reduce contention between the processor pipeline and the bus snoops by implementing a dual ported cache. However, this solution requires additional hardware and interconnect, and is therefore difficult and expensive to implement.

In multi-processor systems, duplicate tags (which are also referred to as "tag caches") may be used to minimize the number of coherence checks performed on a processor. By performing fewer coherence checks on the cache, the cache can be more fully used to execute instructions, and thereby improve system performance.

In prior art implementations, the duplicate tags are an exact copy of the tags of the actual cache. As caches continue to increase in size, either the portion of the cache integrated circuit surface area devoted to maintaining duplicate tags also increases, or the device pin-count (e.g. for off-chip duplicate tags) required to maintain the duplicate tags becomes costly.

A system for maintaining duplicate cache tags in a simple and inexpensive way, and that minimizes the use of integrated circuit surface area by, or device pin-out associated with, such duplicate cache tags would be a significant advance in uniprocessor and multiprocessor architecture design.

SUMMARY OF THE INVENTION

The invention tailors the tag width of duplicate cache tags to the available integrated circuit surface area, or to the device pin count, without significantly sacrificing system performance. Additionally, the invention allows the partial tag width to be reduced at any time during the integrated circuit design phase, should the available integrated circuit surface area or pin-availability decrease.

DETAILED DESCRIPTION OF THE INVENTION

Figure 1:
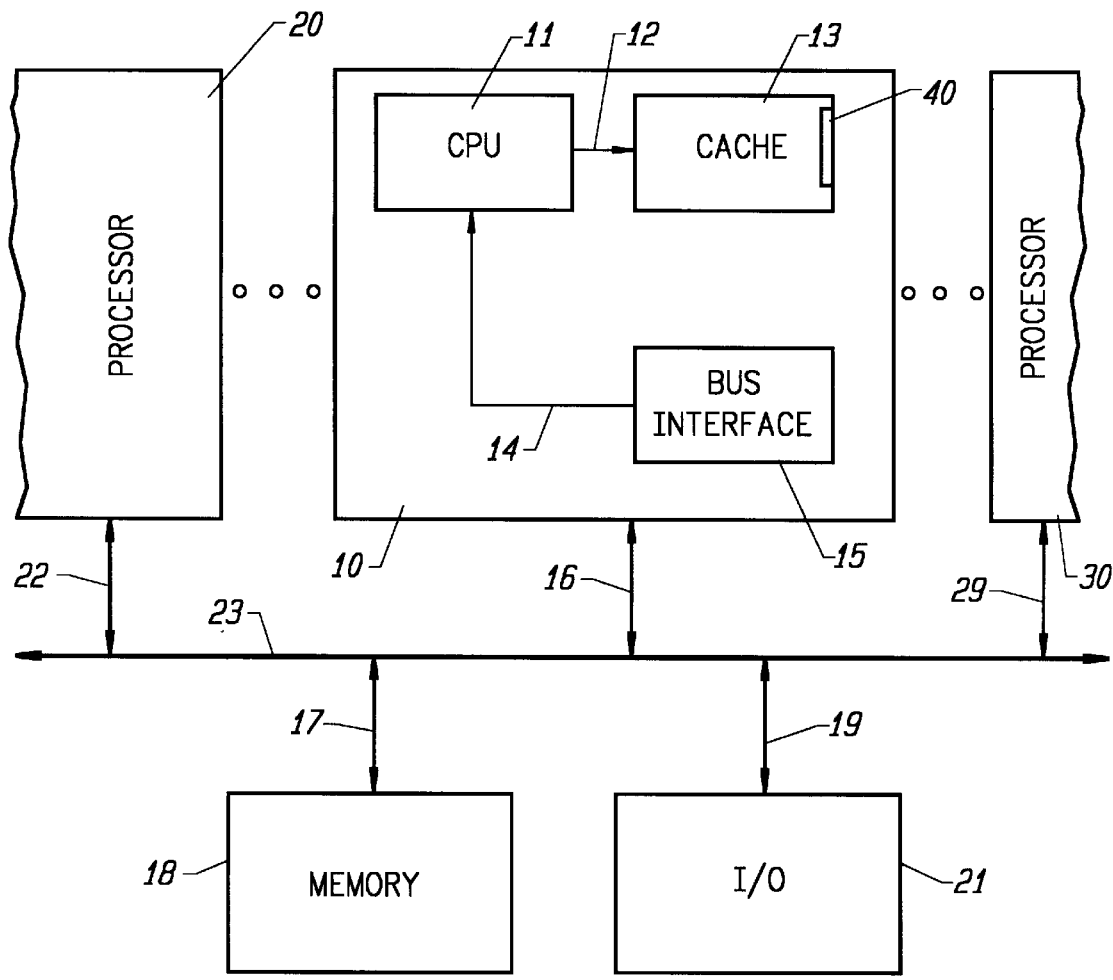
FIG. 1 is a block schematic diagram of an exemplary multiprocessor computer architecture.

FIG. 1 is a block schematic diagram of an exemplary multiprocessor computer architecture. In a multiprocessor computer architecture, a plurality of modules, such as processors 10, 20, 30 are coupled to a system bus 23 by bus links 16, 22, 29, respectively. Any number of processors may be used in such architecture, depending upon processor speed and operating system design. Each processor has an internal structure that includes a central processing unit ("CPU") 11 which is coupled via an internal link 12 to a processor cache memory 13. The processor cache memory includes a cache line 40 that consists of address tags, status, and data components. A bus interface module 15 couples the processor cache to the system bus 23 by an internal link 14 and a bus link 16. The processors are adapted to communicate with each other; with a system memory 18, which is coupled to the system bus 23 by a bus link 17; and with a system input/output ("I/O") module 21 which is coupled to the system bus 23 by a bus link 19.

It should be appreciated that the specific system and processor architectures that are described herein are discussed for purposes of example, and they are not intended to be construed as limitation upon the scope of the invention, which is defined by the claims below. The invention is well adapted for many different types of processors and multi-processor architecture.

Whenever a coherent transaction is issued on the bus 23, each processor 10, 20, 30, acting as a third party, performs a cache coherency check using a virtual index and real address. The invention also has application to systems using physically indexed caches.

Each third party processor is responsible for signaling cache coherency status after the address cycle. The third party processor signals that its cache line 40 is in one of four states: shared, private clean (or "exclusive"), private dirty (or "modified"), or not present (or "invalid"). The requesting processor interprets the coherency status to determine how to mark the cache line, i.e. private clean, private dirty, or shared. The third party also updates its cache line state to indicate: no change, shared, or not present.

If a third party signals that it has the requested line in the private dirty state, then it initiates a cache to cache transaction at a time after the address cycle. The requesting processor discards the data received from main memory for the initial request and instead accepts the data directly from the third party in a cache to cache transfer. At the same time, the data from the third party is written to main memory. Because a multiprocessor system architecture allows multiple outstanding pipeline transactions, it is important that the processor modules be able to perform pipeline cache coherency checks to take maximum advantage of the bus bandwidth. For a discussion of a multiprocessor system architecture of the type with which the invention finds ready application, see K. Chan, T. Alexander, C. Hu, D. Larson, N. Noordeen, Y. Van Atta, T. Wylegala, S. Ziai, *Multiprocessor Features of the HP Corporate Business Servers,* Compcon Digest of Papers (February 1993).

The prior art provides an all-or-nothing approach to duplicating cache tags in a duplicate tag subsystem, in which the entire cache tag is duplicated in the duplicate tag subsystem. Thus, the prior art either implements a full copy of the cache tag contents using duplicate tags and thereby provides improved performance, or the prior art does not implement duplicate tags and therefore saves space on the surface of the integrated circuit and/or device pin count.

In all duplicate cache tag subsystems, there must be a corresponding entry made in the duplicate tags for each cache entry made in the processor. In accordance with the preferred embodiment of the invention, if the width of the processor cache tag is N bits, the width of the duplicate tags can be any value 1 to N−1. The invention thus provides nearly all the performance gain available if full duplicate tags were used, while requiring only a fraction of the integrated circuit surface area and/or device pins that is/are necessary when prior art approaches are used.

In the preferred embodiment of the invention, the cache tags are truncated and a predetermined number of the bits of each cache tag are saved to the duplicate cache tag subsystem. That is, the most specific bits of each cache tag are saved because such bits are most likely to change when an entry is reused to map a new memory address. In other embodiments of the invention, any subset of the cache tag bits may be selected, for example based upon the software's use of physical memory. Accordingly, the invention is not limited to any particular subset of cache tag bits.

The invention also comprises an algorithm that provides a partial cache hit, such that a hit to the partial duplicate tags produces a response indicating that the cache associated with the duplicate cache tag subsystem may have the requested data. In the preferred embodiment of the invention, the memory always supplies the data if the cache line is not dirty. In the event of a partial cache hit, the algorithm herein provides that the memory's data are held until the cache is read to confirm whether or not the cache contains the requested data. If the cache contains the requested data, the memory is released. If the cache does not contain the requested data, i.e. there is a false partial duplicated cache tag hit, then the data are removed directly from memory.

Figure 2:
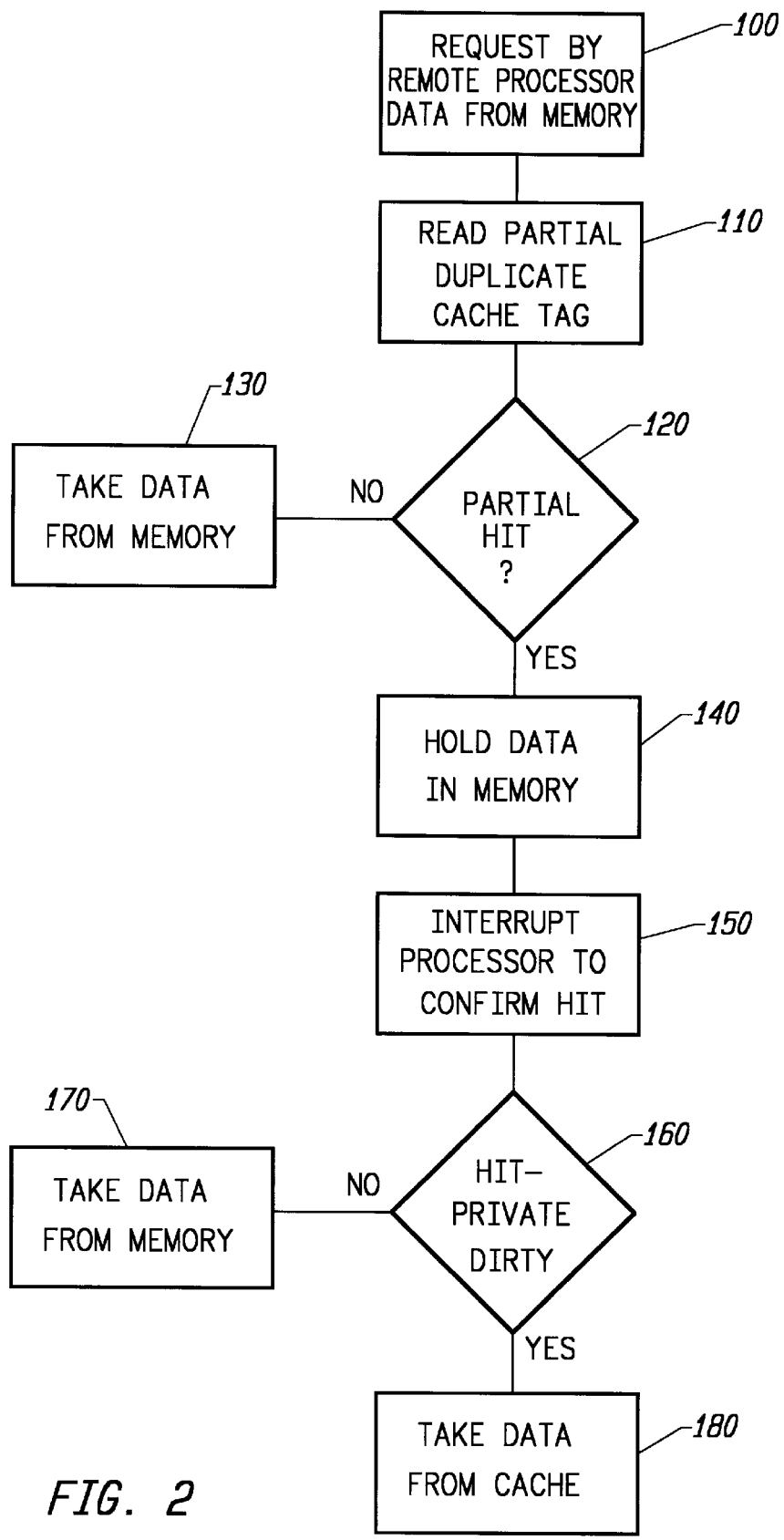
FIG. 2 is a flow diagram that illustrates the operation of a method of maintaining duplicate cache tags in accordance with a preferred embodiment of the invention.

FIG. 2 is a flow diagram that illustrates the operation of a method of maintaining duplicate cache tags in accordance with a preferred embodiment of the invention. As shown on FIG. 2, there is a request by a remote processor 35 (FIG. 3) for data from memory (step 100). The bus interface of the local processor 81 (FIG. 3) reads its partial duplicate cache tag list (step 110) to determine if there is a partial hit (step 120) at the local processor 31. If there is not a partial hit, i.e. there is no match between the requested address and the partial duplicate cache tag list, then the data are taken from the memory (step 130).

If there is a partial hit, i.e. there is a match between the requested address and the partial duplicate cache tag list, then the data are held in memory (step 140) and the local processor 31 is interrupted (step 150) to confirm that the partial duplicate cache tag is, in fact, a truncated form of the requested address, i.e. that there is a cache hit (step 150). If the partial duplicate cache tag matches the actual cache tag, and the status indicates that the block has been modified (hit-private dirty) (step 160), then the data are taken from the cache 32 (FIG. 3) (step 180). Otherwise, the data are taken from memory (step 170).

It should be appreciated that the foregoing describes a two processor system. Clearly, a multiprocessor system will have additional processors. In such case, the above described algorithm is repeated for each processor. Thus, each processor in such system includes a partial duplicate cache tag subsystem.

The invention may introduce some additional latency for a given cache block because of a false duplicate tag hit. The invention may also introduce some additional latency due to the use of a duplicate cache tag lookup in series with the processor cache lookup. The latter latency is found in any cache system that uses duplicate tags. The former latency is considered to be insignificant in view of the substantial saving and improved performance afforded by the invention.

Figure 3:
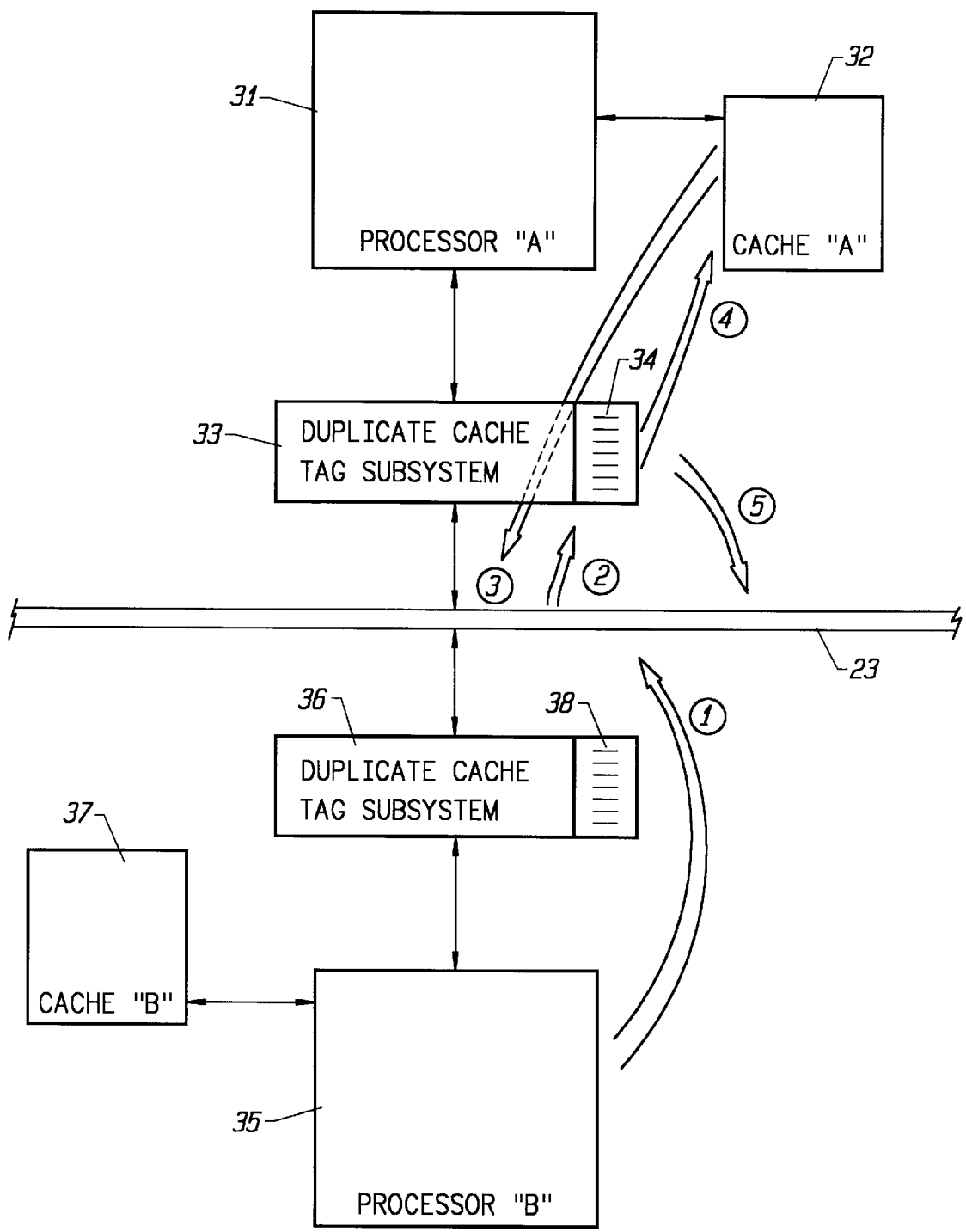
FIG. 3 is a block schematic diagram of a duplicate cache tag subsystem having partial duplicate tags according to the invention.

FIG. 3 is a block schematic diagram of a duplicate cache tag subsystem having partial duplicate tags according to the invention. In the figure, a processor "B" 35 (coupled to a cache 37 and a duplicate tag subsystem 36) requests data on a system bus 23 (as shown in the figure by the arrow identified by the encircled number (1)). The request hits in the partial duplicate tags (Subsystem "A" 33) maintained for a processor "A" 31 (as shown on the figure by the arrow identified by the encircled number (2)). The request from processor "B" 35 may or may not actually hit in the processor "A" cache 32 because the duplicate tags are only partial tags. Such partial tags do not entirely identify the cache line, and may thus be similar to, but not identical to, the desired cache line.

If the request from processor "B" 35 hits the processor "A" cache 32 because the partial tag in the duplicate tag subsystem represents the requested line, then a duplicate tag hit occurs (as shown on the figure by the arrow identified by the encircled number (3)).

If the request from processor "B" 35 does not hit the processor "A" cache 32 because the partial tag in the duplicate tag subsystem was a truncated form of a cache line other than the requested line, then a false duplicate tag hit occurs (as shown on the figure by the arrow identified by the encircled number (4)).

However, if the request from processor "B" 35 misses the duplicate tags entirely, then the requested data are definitely not in the processor "A" cache 32 (as shown on the figure by the arrow identified by the encircled number (5)). In this way, the processor "A" cache 32 only needs to be queried when there are duplicate tag hits. The invention exploits to advantage the fact that such duplicate tag hits are statistically more likely than not to be true hits, as opposed to false partial duplicate tag hits, as opposed to false partial duplicate tag hits, as discussed below.

It is believed that for every bit increase in the width of the duplicate tags, the probability of a false hit is cut in half. For example, for a duplicate tag width of six bits, the probability of a false hit is 1/64; for a duplicate tag width of eight bits, the probability of a false hit is 1/256. When 32-bit addresses (and recently 64-bit addresses) are used, the tag width can often exceed 20 bits. By maintaining only half the tag width in the duplicate tags (i.e. 10 bits), the probability of a false hit is 1/1024, or nearly zero. Therefore, in practice the invention provides a scheme in which nearly all duplicate tag hits are also processor cache hits.

The address locations of the processor's data should not be clumped at a small number of combinations of the partial tag bits when implementing the preferred embodiment of the invention, if the scheme is to provide the expected low false hit rate. In other words, the probability of each partial tag bit being a 1 or 0 should preferably be close to about 50%.

Although the invention is described herein with reference to the preferred embodiment, one skilled in the art will readily appreciate that other applications may be substituted for those set forth herein without departing from the spirit and scope of the present invention. For example, a significant feature of the invention is that the actual number of bits reserved for the partial duplicate cache tag may be chosen as convenient. Thus, as a design evolves, it may be determined that it is preferred to provide a duplicate cache tag having few bits due to the limited availability of integrated circuit surface area and/or device pins; or it may be preferred to achieve greater performance by providing a duplicate cache tag having more bits, thereby minimizing the likelihood of a false partial duplicate cache tag hit.

Accordingly, the invention should only be limited by the claims included below.

We claim:

1. In a system comprising at least a cache, a duplicate cache tag subsystem for maintaining duplicate cache tags, comprising:

a duplicate tag list for maintaining a corresponding entry for at least a portion of any cache entries in said cache;

a processor for performing a coherency check and identifying a partial cache hit, such that a hit to a duplicate tag produces a response indicating that the cache associated with said duplicate cache tag subsystem may have requested data; and a memory or a requestor module, responsive to said processor, for holding data in the event of a partial cache hit, until said cache is read to confirm whether or not said cache contains said requested data;

wherein the width of a cache tag portion of each of said cache entries is N bits;

wherein said duplicate tag comprises any subset of the N bits that constitute the tag portion; and wherein the width of said duplicate tag is selected to be any value from 1 to N−1.

2. The apparatus of claim 1, wherein each cache tag is truncated, and a predetermined number of the least significant bits of each cache tag are saved to said duplicate cache tag subsystem.

3. The apparatus of claim 1, wherein said memory or said requestor module is released by said processor if said cache contains the requested data.

4. The apparatus of claim 1, wherein said requested data is removed from memory by said processor if said cache does not contain said requested data.

5. A method for maintaining duplicate cache tags in a system comprising a cache, comprising the steps of:

requesting data from a memory;

reading a partial duplicate cache tag list to determine if there is a partial cache tag hit;

taking said data from said memory if there is no match between a requested address and said partial duplicate cache tag list;

holding said data in said memory or a requestor module if there is a match between said requested address and said partial duplicate cache tag list; and interrupting processor operation to confirm that said partial duplicate cache tag corresponds to an actual cache tag;

wherein said data are taken from said cache if said partial duplicate cache tag matches said actual cache tag and a corresponding cache status indicates that said data have been modified; and wherein said data are taken from said memory if said partial duplicate cache tag does not match said actual cache tag or said corresponding cache status indicates that said data have not been modified.

6. In a system that includes a cache and a duplicate cache tag subsystem, comprising:

partial duplicate cache tags within a duplicate cache tag list which do not entirely identify a cache line;

a processor for performing a coherency check and for providing a partial cache hit, such that a hit to a duplicate tag produces a response indicating that the cache associated with said duplicate cache tag subsystem may have requested data; and a memory or a requester module, responsive to said processor, for holding data in the event of a partial cache hit, until said cache is read to confirm whether or not said cache contains said requested data;

wherein a processor cache only needs to be queried when there are hits to said duplicate cache tags.

7. The duplicate cache tag subsystem of claim 6, wherein address locations of processor data are not clumped at a small number of combinations of said partial duplicate tags, such that the probability of each partial duplicate tag bit being a 1 or 0 is close to 50%.

8. The duplicate cache tag subsystem of claim 6, wherein the actual number of bits reserved for said partial duplicate cache tags is chosen to provide a duplicate cache tag having few bits due to the limited availability integrated circuit surface area and/or device pins.

9. The duplicate cache tag subsystem of claim 6, wherein the actual number of bits reserved for said partial duplicate cache tags is chosen to achieve greater performance by providing a duplicate cache tag having more bits, thereby minimizing the likelihood of a false partial duplicate cache tag hit.

10. A method for maintaining duplicate cache tags, comprising the steps of:

providing a system comprising at least a processor, a memory, and a cache;

maintaining, in a duplicate cache tag subsystem, a corresponding entry, in the form of a duplicate tag in a duplicate cache tag list, for at least a portion of any cache entries made in a cache; said step for maintaining said duplicate cache tag subsystem comprising the steps of:

saving a predetermined number of the least significant bits of each cache tag with said processor to said duplicate cache tag subsystem; and performing a coherency check with said processor to identify a partial cache hit, such that a hit to a duplicate tag produces a response indicating that the cache associated with said duplicate cache tag subsystem may have requested data;

wherein the width of a cache tag portion of each of said cache entries is N bits;

wherein said duplicate tag comprises any subset of the N bits that constitute the tag portion; and wherein the width of said duplicate tag is selected to be any value from 1 to N−1.

11. The method of claim 10, wherein each cache tag is truncated, and a predetermined number of the least significant bits of each cache tag are saved to said duplicate cache tag subsystem.

12. The method of claim 10 wherein data are held in memory or in a requestor module by said processor in the event of a partial cache hit, until said cache is read to confirm whether or not said cache contains said requested data.

13. The method of claim 12 wherein said memory data are released by said processor if said cache contains the requested data.

14. The method of claim 12 wherein said requested data are removed from memory by said processor if said cache does not contain said requested data.

* * * * *